US011985378B1

(12) United States Patent
Parkinson et al.

(10) Patent No.: US 11,985,378 B1
(45) Date of Patent: May 14, 2024

(54) WEARABLE MEDIA STREAMING SYSTEM

(71) Applicant: RealWear, Inc., Vancouver, WA (US)

(72) Inventors: Christopher Parkinson, Richland, WA (US); Noah Nicholas Balmer, Vancouver, WA (US); James Peter Woodall, Helmond (NL)

(73) Assignee: RealWear, Inc., Vancouver, WA (US)

( * ) Notice: Subject to any disclaimer, the term of this patent is extended or adjusted under 35 U.S.C. 154(b) by 0 days.

(21) Appl. No.: 18/055,374

(22) Filed: Nov. 14, 2022

(51) Int. Cl.
*H04N 21/80* (2011.01)
*G02B 27/01* (2006.01)
*G06F 16/955* (2019.01)
*H04M 1/724* (2021.01)
*H04M 1/72409* (2021.01)
*H04N 21/2187* (2011.01)
*H04N 21/4363* (2011.01)

(52) U.S. Cl.
CPC ..... *H04N 21/43637* (2013.01); *G02B 27/017* (2013.01); *G06F 16/955* (2019.01); *H04M 1/724097* (2022.02); *H04N 21/2187* (2013.01)

(58) Field of Classification Search
CPC .......... H04N 21/43637; H04N 21/2187; G06F 16/955; H04M 1/72412; H04M 2250/02; G08B 13/19621; G08B 13/19658; G08B 13/1966; G08B 13/19663
See application file for complete search history.

(56) References Cited

U.S. PATENT DOCUMENTS

| 8,879,440 | B2 | 11/2014 | Guo et al. | |
|---|---|---|---|---|
| 9,521,199 | B2 | 12/2016 | Madhavan et al. | |
| 9,866,757 | B2 | 1/2018 | He et al. | |
| 9,900,757 | B2 | 2/2018 | Li et al. | |
| 2004/0005915 | A1* | 1/2004 | Hunter | H04M 1/72412 455/575.1 |
| 2016/0028818 | A1* | 1/2016 | Madhavan | H04L 67/1097 709/213 |
| 2017/0193605 | A1 | 7/2017 | Narendran et al. | |

(Continued)

FOREIGN PATENT DOCUMENTS

CA 3087335 A1 7/2019

OTHER PUBLICATIONS

Police1, "The next generation in body camera technology with lifesaving capabilities is here", WOLFCOM, Dec. 15, 2021, 5 pages.

(Continued)

*Primary Examiner* — Alazar Tilahun
(74) *Attorney, Agent, or Firm* — Shook, Hardy & Bacon L.L.P.

(57) ABSTRACT

Embodiments can cause a media capturing device and a carrier device to establish a communication session there between so that the media capturing device can receive hotspot credentials and connect to a hotspot of the carrier device for Internet connectivity. The media capturing device can then connect to a remote streaming server via the hotspot, causing the creation of a media stream associated with a unique identifier of the media capturing device at a streaming server. The streaming server can return a URL associated with the media stream of the media capturing device to the carrier device, so that the carrier device can access, view, control, or share the media stream with other computing devices.

20 Claims, 6 Drawing Sheets (56) References Cited

U.S. PATENT DOCUMENTS

| | | | | |
|---|---|---|---|---|
| 2017/0347039 A1* | 11/2017 | Baumert | ................ | H04N 5/265 |
| 2019/0124290 A1* | 4/2019 | Yuan | ...................... | H04N 5/772 |
| 2019/0331914 A1* | 10/2019 | Lee | ........................ | G06F 3/013 |
| 2022/0155853 A1 | 5/2022 | Fan et al. | | |
| 2022/0191601 A1* | 6/2022 | Madishetti | ......... | H04N 21/6587 |
| 2022/0342213 A1* | 10/2022 | Lu | .......................... | G06F 3/012 |

OTHER PUBLICATIONS

Pablo Përez et al., "Live Free-Viewpoint Video in Immersive Media Production Over 5G Networks", IEEE Transactions on Broadcasting 68(2), Mar. 14, 2022, 12 pages.

\* cited by examiner

WEARABLE MEDIA STREAMING SYSTEM

CROSS REFERENCE TO RELATED APPLICATIONS

This application is related by subject matter to commonly-assigned and concurrently-filed U.S. patent application Ser. No. 18/055,369, titled "WIRELESS DISPLAY FOR HEADSET", filed Nov. 14, 2022, the same date as the present application, which is hereby expressly incorporated by reference in its entirety.

BACKGROUND

Digital video camera devices are utilized in a variety of use cases. Consumers and businesses alike utilize video camera devices to capture video content in live action scenarios. In some cases, video content can be live streamed to remote client devices, provided that network connectivity is readily accessible.

SUMMARY

This summary is provided to introduce a selection of concepts in a simplified form that are further described below in the detailed description. This summary is neither intended to identify key or essential features of the claimed subject matter, nor is it intended to be used as an aid in determining the scope of the claimed subject matter.

Embodiments of the present invention relate to wireless video systems. More specifically, systems and methods are disclosed relating to wireless camera accessories for wireless carrier devices and the provision of live media streaming services associated therewith. In conventional wireless streaming video systems, wireless cameras either have built-in cellular connectivity to wireless carriers so that they can stream video to other devices, or they have wireless components that enable connectivity to another computing device (e.g., a mobile phone), so that video can be streamed directly from the wireless camera to the computing device. Unfortunately, wireless cameras having built-in cellular connectivity are generally heavier, require larger batteries, and have a larger footprint, which is not optimal in wearable configurations. Similarly, wireless cameras that wirelessly connect to other computing devices and stream live captured video thereto, generally do not facilitate live streaming capabilities over the Internet. Instead, such wireless cameras allow wireless streaming from the camera to a single computing device, which can at best record the wireless stream for subsequent communication to other devices. In this regard, embodiments described herein generally relate to systems and techniques for wirelessly coupling a camera accessory to a computing device, such as a mobile phone, so that the mobile phone can provide Internet access to the camera accessory and further facilitate the creation of a live stream that other computing devices can access.

In an embodiment, a computerized system for live streaming media content includes a media capturing device, a streaming server, and a mobile computing device (e.g., a smart phone). The media capturing device is associated with a unique identifier and has at least one media input component, such as a microphone or a camera. The mobile computing device can provide credentials to access a wireless hotspot of the mobile computing device to the media capturing device. The media capturing device can access the wireless hotspot and automatically initiate, with the streaming server via an Internet connection facilitated via the wireless hotspot, a media stream associated with the unique identifier. The media stream can include media, such as audio and video information, being captured via the at least one media input module. The mobile computing device can then generate a request to access the live stream based on the unique identifier associated with the media capturing device, and communicate the request to the streaming server. The streaming server can then generate a URL to the live stream that it is hosting and communicate it back to the mobile computing device based on the request. The mobile computing device can receive the URL associated with the live stream from the streaming server, and access the URL to display the relay of the live stream. In some aspects, the mobile device can communicate the URL to other computing devices, so that multiple computing devices can view the live stream.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As digital camera technology has advanced in recent years, the number of camera devices capable of recording and/or streaming live video over the Internet has expanded a great deal. These devices, however, generally incorporate carrier service technology (e.g., 5G services) that enables the camera devices to communicate directly with a telecommunications company or Internet service provider. Such devices are oftentimes sold as or incorporated into smart phones or tablets with cellular services. While these handheld devices are ubiquitous, users oftentimes find handheld devices to be impractical as a communications means or as a reference tool, particularly when they are performing tasks that require use of their hands. To address such concerns, among many others, RealWear, Inc. has developed wearable, hands-free communications solutions, known as the HMT-1®, the HMT-1Z1®, and the RealWear Navigator™. The HMT-1®, the HMT-1Z1®, and the RealWear Navigator™ each incorporates cutting-edge technologies that facilitate live video communications for remote expert viewing and guidance, digital workflow solutions, document retrieval and navigation, industrial IOT data visualization, and high-resolution photo capture, among many other things. The HMT-1®, the HMT-1Z1®, and the RealWear Navigator™ are each wearable computing devices that are suitable for use in various industrial settings, as they are fully-encapsulated and built rugged. While the HMT-1®, the HMT-1Z1®, and the RealWear Navigator™ have demonstrated a great deal of commercial success, RealWear has learned that many of their users are typically carrying a carrier device (e.g., a smart phone or tablet with cellular connectivity) while wearing their RealWear devices. To reduce the weight and footprint of a wearable computing device that is capable of providing the many features of the HMT-1®, the HMT-1Z1®, or the RealWear Navigator™, RealWear Inc. has developed various solutions described herein to harness the resources (e.g., Internet connectivity, processing power) of a user's carrier device, to provide the same great features and services of the HMT-1®, the HMT-1Z1®, and the RealWear Navigator™, but in a low profile and lightweight wearable camera accessory for use in tandem with a user's carrier device.

The concept of wirelessly coupling digital video cameras with computing devices is not necessarily new, though implementations are very limiting. For instance, a variety of action cameras on the market include Wi-Fi functionality, which enables connectivity between the action camera and a user's smart phone. In most implementations, the Wi-Fi functionality is provided merely as a means for the video data captured by the camera to be streamed via the Wi-Fi connection and displayed on the user's smart phone, like a wireless monitor of sorts. Camera manufacturers have also developed mobile applications for user's smart phones, which can be run alongside the camera to facilitate the wireless monitoring and streaming capabilities. In some instances, the mobile applications can facilitate remote control functions of the camera as well, though these remote control functionalities are generally limited to direct Wi-Fi connections between the camera and smart phone.

One downside of conventional mobile applications, as monitoring and streaming conduits for wireless cameras, is that the mobile applications must be running or otherwise in focus on users' smart phones in order to maintain live monitoring sessions or to facilitate wireless video streaming over the Internet. If a compatible mobile application is closed, moved out of focus, or if the user's smart phone screen is turned off, wireless streaming sessions between wireless cameras and users' smart phones are paused or otherwise terminated. This is because in conventional systems, a wireless camera includes a Wi-Fi module that can function as an access point to which a user's smart phone can connect to and thereby facilitate a wireless session between the smart phone and wireless camera. The wireless camera's Wi-Fi module is not one that provides Internet connectivity, but instead merely facilitates a wireless connection between the wireless camera and a user's smart phone. When the user's smart phone connects to the wireless camera's Wi-Fi module, the user's smart phone prioritizes the Wi-Fi connection as its source of network connectivity and thus does not connect to the Internet through its carrier service technology. To this end, conventional methods for wirelessly pairing wireless cameras with smart phones are very limited in functionality and connectivity.

It would be beneficial for a wireless camera to connect to a user's smart phone in such a way that connectivity between the wireless camera and the smart phone would not not be interrupted by the closing or changing of applications, or by the locking or the deactivation of the smart phone screen. It would also be beneficial for both devices (i.e., the smart phone and wireless camera) to have connectivity to the Internet, to facilitate streaming or remote connectivity from or to either device, if desired.

Embodiments of the present invention are directed to systems, methods, and computer-readable media having instructions to perform steps, each to cause a media capturing device (e.g., a wearable Wi-Fi camera) and a mobile computing device (e.g., a smart phone) to establish a communication session there between so that the media capturing device can receive hotspot credentials and connect to a hotspot of the mobile computing device for Internet connectivity. The media capturing device can then connect to a streaming server via the hotspot, causing the creation of a media stream associated with a unique identifier of the media capturing device at a streaming server. The streaming server can return a URL associated with the media stream of the media capturing device to the mobile computing device, so that the mobile computing device can access, view, control, or share the media stream.

Figure 1:
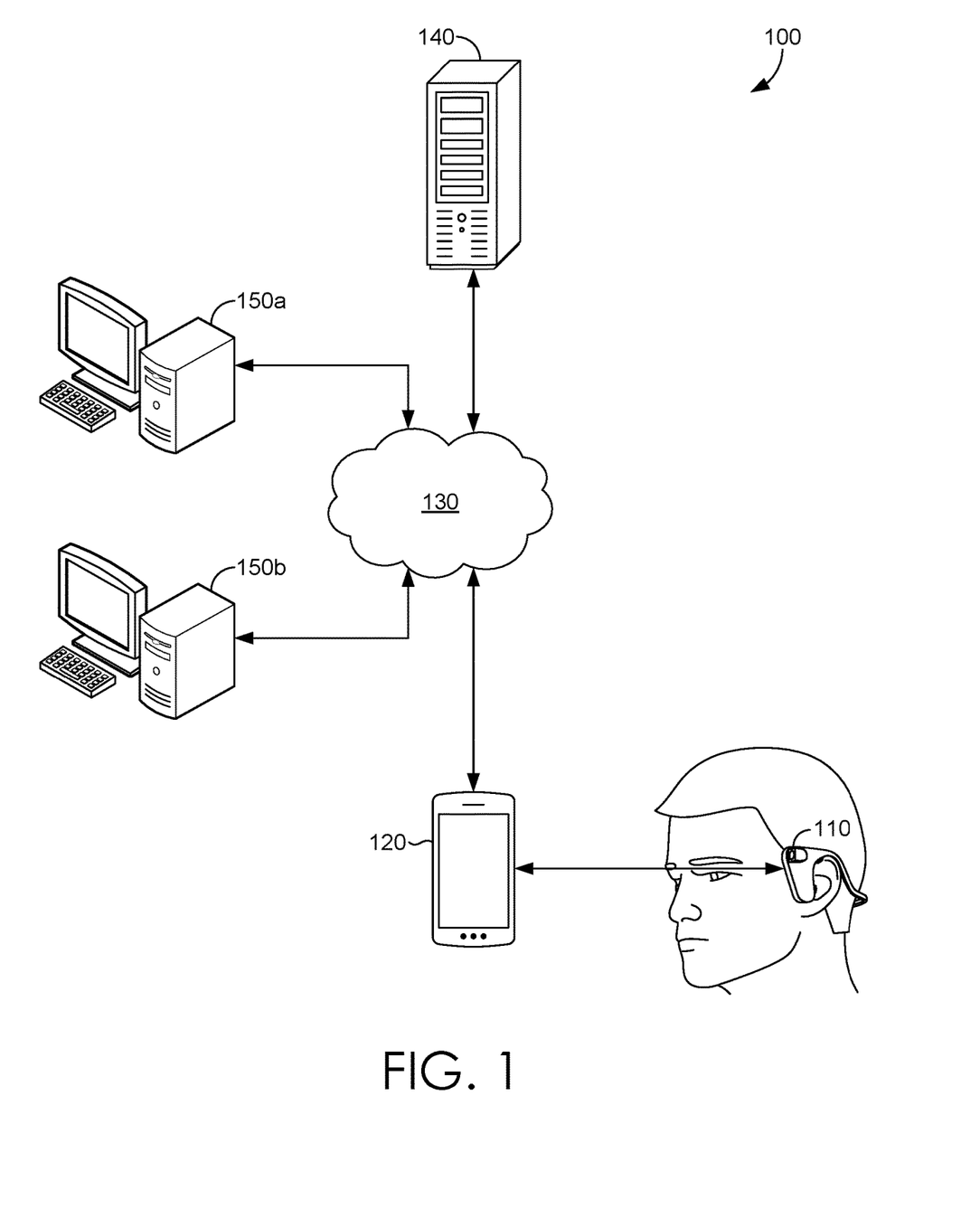
FIG. 1 is an exemplary operating environment in accordance with an embodiment of the present invention.

Turning now to FIG. 1, a schematic depiction is provided illustrating an exemplary system 100 in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 of FIG. 1 includes a media capturing device 110, preferably a wearable camera accessory, that is in coupled communication with a carrier device 120. The media capturing device 110 can include any number of media input modules, such as a video capturing module (e.g., a camera), an audio capturing module (e.g., a microphone), any other light sensing (e.g., infrared sensor) or emitting (e.g., LED, laser) module, or any combination thereof. The media capturing device 110 can include one or more wireless communication modules, such as a Bluetooth module, a Wi-Fi module, or any other short or long range wireless communication module that facilitates communication between the media capturing device 110 and one or more computing devices, such as is described herein in accordance with computing device 700 of FIG. 7.

Figure 7:
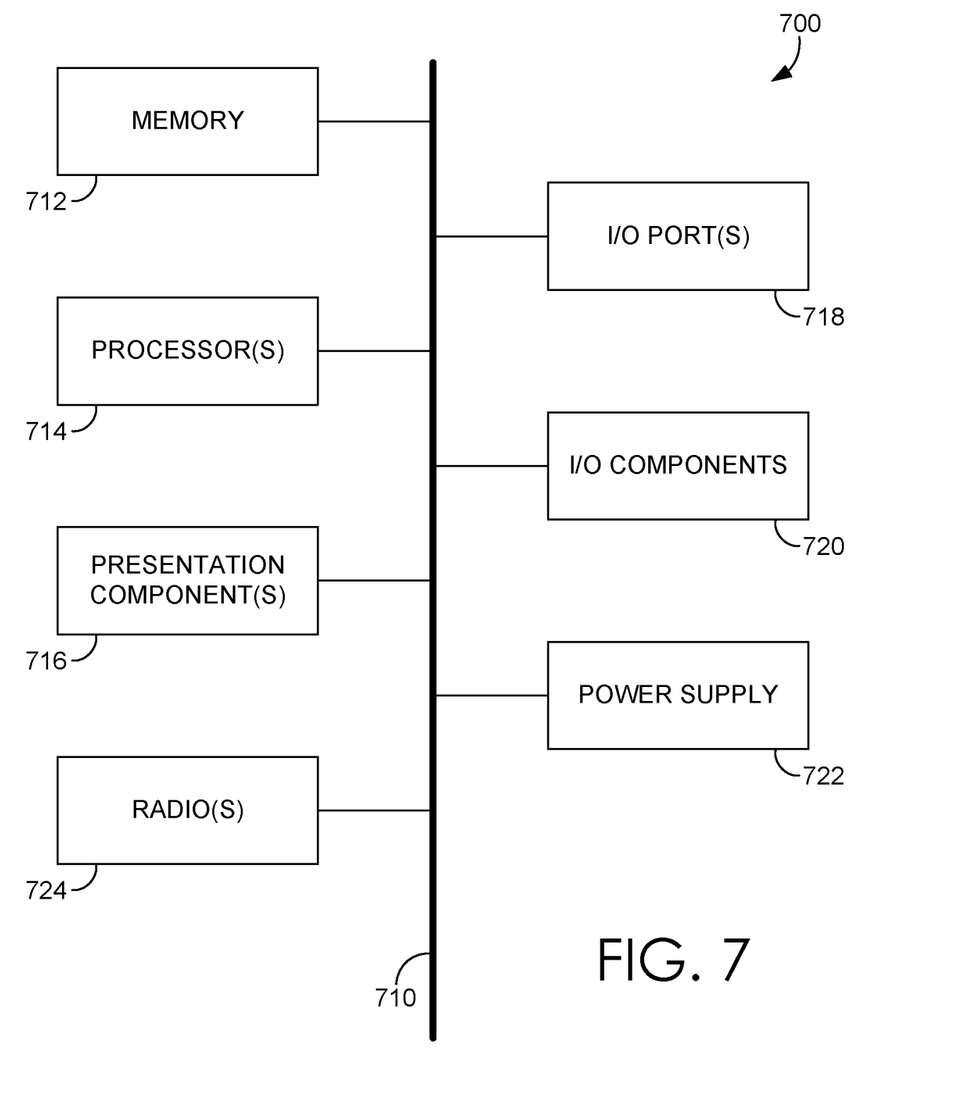
FIG. 7 is a block diagram of an exemplary computing environment suitable for use in implementing some embodiments of the present invention.

The carrier device 120 can include any computing device, such as is described in accordance with computing device 700 of FIG. 7. The computing device can be in the form of a smart phone, tablet, laptop, gaming device, or the like, though a portable form-factor is preferred. The computing device can include one or more wireless communication modules for short-range communication (e.g., Bluetooth), long-range communication (e.g., Wi-Fi), and carrier service communications (e.g., LTE, 3G, 4G, 5G), among other things. The carrier service communications facilitate Wide Area Network (e.g., Internet) connectivity from the carrier device 120. In some embodiments, the carrier device 120 includes a wireless hotspot that activates a Wi-Fi access point within the carrier device 120, so that other computing devices within a transmissible range of the Wi-Fi access point can connect thereto and utilize the network 130 (e.g., Internet) connectivity of the carrier device 120.

In a preferred embodiment, the media capturing device 110 is a lightweight head-worn device that can be worn around a user's head, as is depicted as the wearable camera device in FIG. 1. It is contemplated, however, that the media capturing device 110 could also be clipped to or otherwise releasably attached to an article of a user's clothing, headwear, luggage, grip, monopod, tripod, or the like. To this end, for purposes of the present disclosure and merely for use as a non-limiting reference, the media capturing device 110 will also be referred to herein as a "headset" as a result of the representative illustration of FIG. 1.

In embodiments, the media capturing device 110 can receive long-range wireless (e.g., Wi-Fi) pairing information from the carrier device 120. In a preferred embodiment, the pairing information (e.g., WPA, WPA2, WPA3, WEP, TKIP, Wi-Fi access credentials generally) is associated with a Wi-Fi hotspot service of the carrier device 120, though it is contemplated that the pairing information may be associated with another Wi-Fi hotspot or an access point within the range of the carrier device 120 and/or the media capturing device 110.

In some embodiments, the media capturing device 110 can obtain the pairing information from the carrier device 120 by scanning a code (e.g., QR code, bar code) or text displayed on a screen of the carrier device 120. It is contemplated that either upon turning on the media capturing device 110 or in response to predefined set of button presses on the media capturing device 110, the media capturing device 110 can enter a scanning mode to activate the camera, scan the display of the carrier device 120 positioned in front of the camera, decode the code or text on the display to obtain the pairing information, and utilize the obtained pairing information to connect to the Wi-Fi hotspot service or access point. It is contemplated that an application of the carrier device 120, such as one that may be associated with the media capturing device 110, can facilitate the generation of the code, activate and/or deactivate the hotspot, or define and/or change the pairing information, among other things.

In some other embodiments, the media capturing device 110 can obtain the pairing information from the carrier device 120 via a short range wireless pairing there between. For instance, the media capturing device 110 can enter a Bluetooth pairing mode in response to turning on the media capturing device 110 or in response to a predefined set of button presses on the media capturing device 110. Similarly, the carrier device 120 can enter a Bluetooth pairing mode via its operating system services or via an application of the carrier device 120, such as one that may be associated with the media capturing device 110, that can employ operating system services to enter the Bluetooth pairing mode. To this end, the media capturing device 110 can wirelessly receive, via the short range wireless connection with the carrier device 120, pairing information that can be utilized to connect to the Wi-Fi hotspot service or access point. As discussed above, it is contemplated that an application of the carrier device 120, such as one that may be associated with the media capturing device 110, can activate and/or deactivate the hotspot or define and/or change the pairing information, among other things.

In various embodiments, the media capturing device 110 is associated with a unique identifier, such as a unique serial number, MAC identifier, code name, or the like. In a preferred embodiment, the unique identifier associated with the media capturing device 110 is communicated or otherwise received by the carrier device 120. In embodiments where the media capturing device 110 is wirelessly paired with the carrier device 120 (e.g., via a Bluetooth connection), it is contemplated that the unique identifier can be wirelessly communicated from the media capturing device 110 to the carrier device 120 via the short range wireless pairing there between. In embodiments where no short range wireless pairing is available, it is contemplated that the unique identifier can be manually entered (e.g., via a keyboard), or otherwise input by other means, into the carrier device 120 so that the unique identifier of the media capturing device 110 is stored or otherwise received by the carrier device 120. It is also contemplated that the ability to receive and store the unique identifier of the media capturing device 110 is facilitated by the application associated with the media capturing device 110 executing on the carrier device 120.

In various embodiments, after the hotspot or access point pairing information is provided to media capturing device 110, and the unique identifier is provided to the carrier device 120, the media capturing device 110 can connect to the access point or the hotspot of the carrier device 120 to access the network 130. In some embodiments, after the exchange of the pairing information and the unique identifier between the media capturing device 110 and the carrier device 120 is completed, the short range wireless pairing between the media capturing device 110 and the carrier device 120 can be terminated. That is, in some embodiments, the Bluetooth connection between the media capturing device 110 and the carrier device 120 is no longer necessary and can be deactivated. After the unique identifier of the media capturing device 110 is provided to the carrier device 120, and the pairing information of the carrier device 120 is provided to the media capturing device 110, the carrier device 120 can establish connectivity to the network 130 via its carrier service, and the media capturing device 110 can establish connectivity to the network 130 via the hotspot of the carrier device 120.

In some embodiments, in response to establishing connectivity to the network 130, the media capturing device 110 can contact a streaming server 140 via network 130. The streaming server 140 can include one or more computing devices as described in accordance with the computing device 700 of FIG. 7, and can host or otherwise facilitate the creation of a live stream of media data (e.g., video data, audio data) captured by the media capturing device 110 and accessible via the network 130. In some embodiments, the streaming server 140 can generate a URL to the live stream, whereby the URL is uniquely associated with the unique identifier of the media capturing device 110. The streaming server 140, in some instances, can limit access to the live stream by creating and/or associating access credentials to the live stream. The URL, and the access credentials (if applicable), can be shared to the carrier device 120 via the network 130, such that the carrier device 120 can access the URL and/or share the URL with other computing devices, such as computing devices 150a, 150b. While illustrated as a desktop PC, the computing devices 150a, 150b can each include any one or more computing devices as described in accordance with the computing device 700 of FIG. 7.

In some embodiments, the carrier device 120 or other computing devices 150a, 150b can access the URL and view, on respective displays, the media data (or a version of the media data) that is being captured by the media input modules of the media capturing device 110 and streamed through the network 130 to a live stream hosted by the streaming server 140. In embodiments, the live stream has been initiated and accessed utilizing the media capturing device 110, which is a media capturing device that does not have an interactive user interface or display—each of which is generally known to consume a considerable amount of valuable battery power. Instead, the carrier device 120 has facilitated connectivity of the media capturing device 110 to the network 130 so that the resource-intensive tasks can be offloaded from the media capturing device 110 and the carrier device 120—for instance, the live stream can be created, hosted, and accessed by other computing devices. In addition, as the carrier device 120 is accessing the live stream via the URL, the user (or wearer) of the media capturing device 110 can utilize the carrier device 120 as a view finder, such that any video information that is being captured by the media capturing device 110 can be displayed on a display of the carrier device 120 and observed by the user.

As will be described, the system 100 (or portions thereof) described herein can facilitate remote administrator features, such that a remote viewer (e.g., carrier device 120, other computing devices 150a, 150b) can control various features of the media capturing device 110, or modify characteristics of the media data that is being captured by the media capturing device 110 and/or streamed from the streaming server 140. By way of example, the streaming server 140 can create different access credentials to the URL—one set of credentials having view-only access to the live stream, another set of credentials having view and control features for the live stream. In another example, the streaming server 140 can create separate URLs to the live stream, with one URL having view-only access while the other URL has view and control features to the live stream. The foregoing embodiments are merely examples, and it is contemplated that any configuration for providing control access to the live stream can be implemented within the purview of the present disclosure.

In some embodiments, the control features for the live stream can include a GUI that can be displayed on any computing device, separate from or overlaid onto the live stream of the media data. The control features can include any variety of features that may be useful for controlling or annotating media data that is being captured by and streamed by the media capturing device 110. By way of non-limiting example, the control features can include controls for sending signals to the media capturing device 110, via the streaming server 140, to activate or deactivate features of the media capturing device 110 or components thereof. For instance, the signals can cause the media capturing device 110 to turn on/off optical image stabilization, optical zoom in or out, crop or modify aspect ratio, turn on/off audio cancellation, turn up/down volume, turn on/off the microphone, or turn up/down microphone volume, among other things. In another non-limiting example, the control features can include controls for sending signals to the streaming server 140, to activate or deactivate features that the streaming server 140 can provide for the live stream. For instance, the signals can cause the streaming server 140 to turn on/off electronic image stabilization, optical zoom in or out, crop or modify aspect ratio, turn on/off audio cancellation, turn up/down volume, turn on/off the microphone, or turn up/down microphone volume, among other things. That is, any of the foregoing features that may be offered by the media capturing device 110 may also be, or alternatively be offered by, the streaming server 140. In some embodiments, a remote annotate feature may be provided as well, such that a remote viewer can annotate the live stream on their respective computing device. In this way, the remote viewer annotating the live stream can modify aspects (e.g., frames, output) of the live stream so that other remote viewers can view the annotated live stream. By way of example, the remote viewer may activate a remote annotate feature that facilitates typing, drawing, or overlaying images onto the live stream, utilizing a respective computing device while viewing the live stream. In this way, whatever information is typed, drawn, or otherwise positioned on the live stream may appear to all other remote viewers of the live stream on their respective computing devices.

Figure 2:
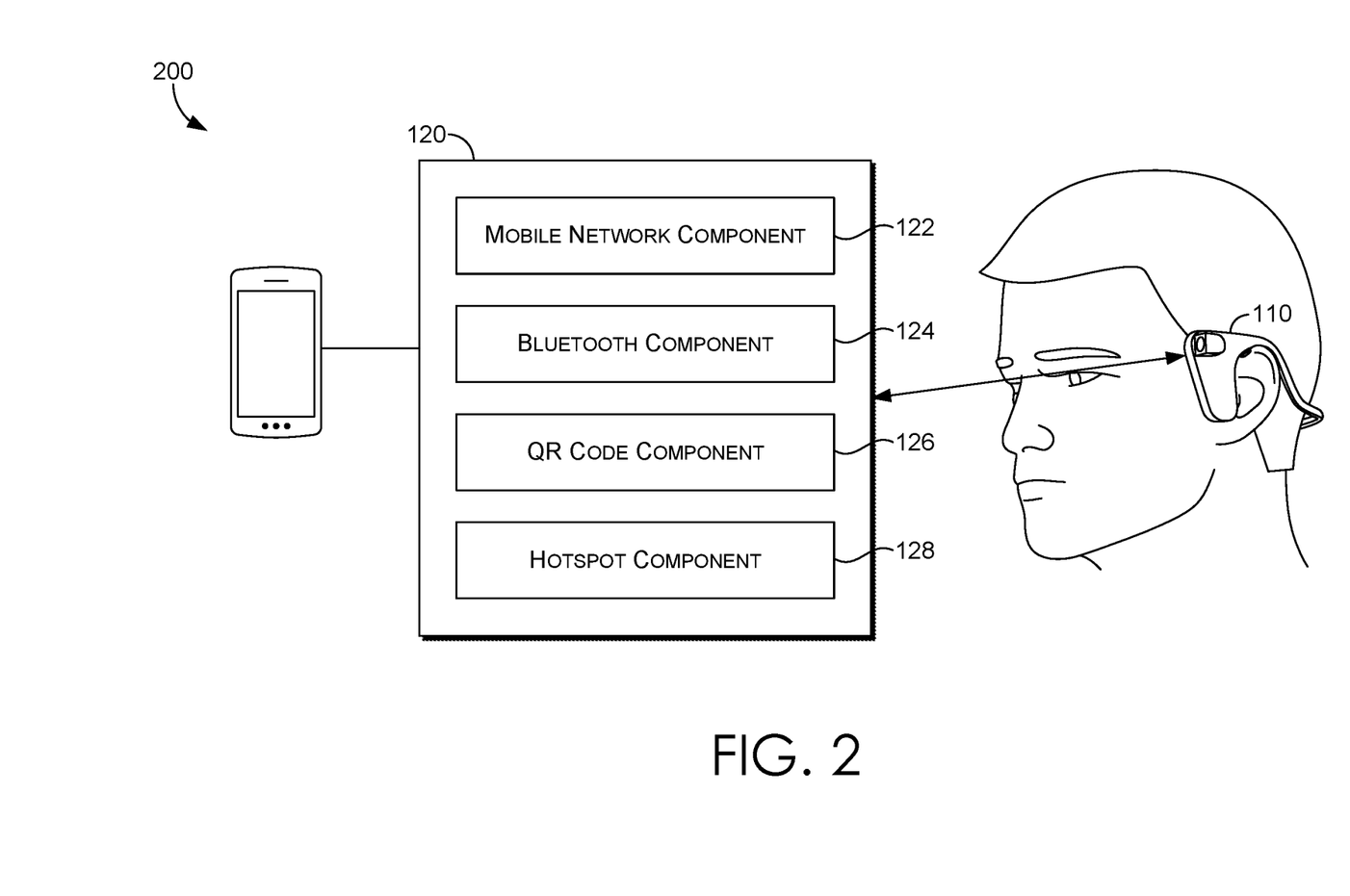
FIG. 2 is a block diagram of a carrier device in accordance with some embodiments of the present invention.

Looking now to FIG. 2, a block diagram 200 is provided, depicting a carrier device 120 in wireless communication with a media capturing device 110, as is similarly depicted in FIG. 1. In accordance with various embodiments, the carrier device 120 described herein can include any computing device, as is described in accordance with computing device 700 of FIG. 7. The carrier device 120 can include, among other things, a mobile network component 122, a Bluetooth component 124 or other short-range wireless component, a QR code component 126, and a hotspot component 128. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

In various embodiments, the carrier device 120 can include a mobile network component 122, which can correspond to the one or more wireless carrier service modules described in accordance with the carrier device 120 of FIG. 1. The mobile network component 122 facilitates wireless network connectivity between the carrier device 120 and one or more communications towers of a telecommunications carrier. In embodiments, the telecommunications carrier can provide any generally known data service to the carrier device 120, such as LTE, 3G, 4G, 5G, or the like. In a preferred embodiment, the network connectivity available to the carrier device 120 by its telecommunications carrier includes a high-speed broadband-type technology (e.g., 5G) to facilitate high-speed transmission of video and/or audio data captured via media capturing device 110 and communicated to the carrier device 120, for wireless media-streaming applications, among other things.

In some embodiments, the carrier device 120 can include a Bluetooth component 124 that facilitates short-range communications, and in some instances temporary communications, between the carrier device 120 and media capturing device 110. The media capturing device 110 can obtain the pairing information from the carrier device 120 via a short range wireless (e.g., Bluetooth) pairing there between. For instance, media capturing device 110 can enter a Bluetooth pairing mode in response to turning on the media capturing device 110 or in response to a predefined set of button presses on the media capturing device 110. Similarly, the Bluetooth component 124 of the carrier device 120 can enter a Bluetooth pairing mode, and the carrier device 120 can be selectively associated with the media capturing device 110. To this end, the media capturing device 110 can wirelessly receive, via the short range wireless connection with the carrier device 120, pairing information that can be utilized to connect to a Wi-Fi hotspot service or access point of the carrier device 120, as will be discussed. As discussed above, it is contemplated that an application of the carrier device 120, such as one that may be associated with the media capturing device 110, can activate and/or deactivate the hotspot or define and/or change the pairing information, among other things.

In some other embodiments, the media capturing device 110 can obtain the pairing information from the carrier device 120 by scanning a code (e.g., QR code, bar code) or text displayed on a screen of the carrier device 120. It is contemplated that either upon turning on the media capturing device 110 or in response to predefined set of button presses on the media capturing device 110, the media capturing device 110 can enter a scanning mode to activate the camera, scan the display of the carrier device 120 positioned in front of the camera, decode the code or text on the display to obtain the pairing information, and utilize the obtained pairing information to connect to the Wi-Fi hotspot service or access point. It is contemplated that an application of the carrier device 120, such as one that may be associated with the media capturing device 110, can activate a QR code component 126 that generates the QR code, activates and/or deactivates the hotspot, or defines and/or changes the pairing information, among other things. It is contemplated that the pairing information can stay the same, or change after a predefined number of times the QR code is generated, or after a period of time one QR code is generated.

In various embodiments, the media capturing device 110 is associated with a unique identifier, such as a unique serial number, MAC identifier, code name, or the like. In a preferred embodiment, the unique identifier associated with the media capturing device 110 is communicated or otherwise received by the carrier device 120 (e.g., via QR code or short-range communications). In embodiments where the media capturing device 110 is wirelessly paired with the carrier device 120 (e.g., via a Bluetooth connection), it is contemplated that the unique identifier can be wirelessly communicated from the media capturing device 110 to the carrier device 120 via the short range wireless pairing there between. In embodiments where no short range wireless pairing is available, it is contemplated that the unique identifier can be manually entered (e.g., via a keyboard), or otherwise input by other means into the carrier device 120 so that the unique identifier of the media capturing device 110 is stored or otherwise received by the carrier device 120. It is also contemplated that the ability to receive and store the unique identifier of the media capturing device 110 is facilitated by the application associated with the media capturing device 110 executing on the carrier device 120.

In various embodiments, the carrier device 120 can include a hotspot component 128, which is a Wi-Fi component within the carrier device 120 that can operate as a Wi-Fi access point. In other words, the hotspot component 128 can in essence turn the carrier device 120 into an access point so that other computing devices can wirelessly connect (via Wi-Fi connection) to the carrier device 120. The hotspot component 128 can enable one or more other computing devices wireless connected to the carrier device 120 to connect to the mobile network component 122, such that the network connectivity provided to the carrier device 120 is also provided to the other computing devices wirelessly connected to the hotspot component 128.

Figure 3:
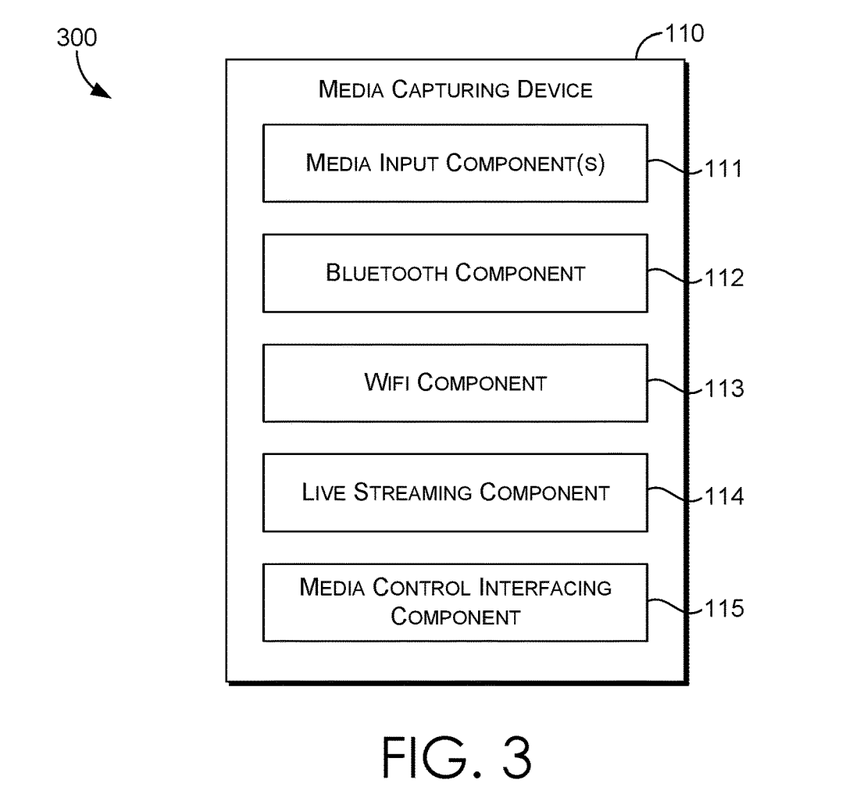
FIG. 3 is a block diagram of a media capturing device in accordance with some embodiments of the present invention.

Looking now to FIG. 3, a block diagram 300 is provided depicting a media capturing device 110, as is similarly described in accordance with FIG. 1. In accordance with various embodiments, the media capturing device 110 includes a wearable camera accessory that can be in coupled wireless communication with a carrier device 120. The media capturing device 110 can include any number of media input modules, such as a video capturing module (e.g., a camera), an audio capturing module (e.g., a microphone), any other light sensing (e.g., infrared sensor) or emitting (e.g., LED, laser) module, or any combination thereof. While embodiments described herein depict a media capturing device 110 that does not have a display for purposes of extended battery life, it is contemplated that some embodiments may include one. The media capturing device 110 can include one or more wireless communication modules, such as a Bluetooth module, a Wi-Fi module, or any other short or long range wireless communication module that facilitates communication between the media capturing device 110 and one or more computing devices, such as is described herein in accordance with computing device 700 of FIG. 7

In accordance with various embodiments, the media capturing device 110 can include at least one media input component 111, a Bluetooth component 112 or other short-range wireless component, a Wi-Fi component 113, a live streaming component 114, or a media control interfacing component 115, among other things. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As is described, the media capturing device 110 (or "headset") is a lightweight head-worn device that can be worn around a user's head, as depicted as wearable camera device 110 in FIG. 1. It is contemplated, however, that the media capturing device 110 could also be clipped to or otherwise releasably attached to an article of a user's clothing, headwear, luggage, grip, monopod, tripod, or the like. In accordance with various embodiments, the media capturing device 110 can include at least one media input component 111, also referred to herein as media input modules. A media input component 111 can include a video capturing module (e.g., a camera), an audio capturing module (e.g., a microphone), any other light sensing (e.g., infrared sensor) or emitting (e.g., LED, laser) module, or any combination thereof. In embodiments, the media capturing device 110 can utilize any one or more of the media input components 111 to capture media data (e.g., video, audio, light) and store the media data into a memory of the media capturing device 110. In some embodiments, the memory can include a temporary memory, like a storage buffer, for temporarily storing the captured media data before it is stored into another memory or streamed via the network. In some other embodiments, the memory can further include an internal memory, or a removable memory card, for storing the captured media data for subsequent access.

In some embodiments, the media capturing device 110 can further include a short range wireless communication module, such as a Bluetooth component 112, which facilitates short range wireless communication between the media capturing device 110 and a mobile computing device, such as carrier device 120 of FIGS. 1 and 2. It is contemplated that the Bluetooth component 112 can be activated by turning on the media capturing device 110, holding down a mode button and/or other button of the media capturing device 110, or pressing a sequence of buttons on the media capturing device 110. As noted herein, the media capturing device 110 can be associated with a unique identifier (e.g., serial number, MAC, IP address, code), and that unique identifier can be communicated to any device paired to or pairing with the media capturing device 110 via the Bluetooth component 112.

In various embodiments, the media capturing device 110 can obtain pairing information from the carrier device 120 to access its hotspot component 128 of FIG. 2. In some embodiments, the media capturing device 110 can activate and employ a media input component 111 (e.g., a camera) to scan a code (e.g., QR code, bar code) or text displayed on a screen of the carrier device 120 displaying the pairing information. It is contemplated that either upon turning on the media capturing device 110 or in response to predefined set of button presses on the media capturing device 110, the media capturing device 110 can enter a scanning mode to activate the media input component 111, scan the display of the carrier device 120 positioned in front of the camera, decode the code or text on the display to obtain the pairing information, and utilize the obtained pairing information to connect to the Wi-Fi hotspot service or access point of the carrier device 120. It is contemplated that an application of the carrier device 120, such as one that may be associated with the media capturing device 110, can facilitate the generation of the code, activate and/or deactivate the hotspot, or define and/or change the pairing information, among other things. In some other embodiments, the media capturing device 110 can obtain the pairing information from the carrier device 120 via a short range wireless pairing with the carrier device 120 facilitated via the Bluetooth component 112. For instance, the media capturing device 110 can activate the Bluetooth component 112 in response to turning on the media capturing device 110 or in response to a predefined set of button presses on the media capturing device 110. Similarly, the carrier device 120 can enter a Bluetooth pairing mode via its operating system services or via an application of the carrier device 120, such as one that may be associated with the media capturing device 110, which can employ operating system services to enter the Bluetooth pairing mode. To this end, the media capturing device 110 can wirelessly receive, via the short range wireless connection with the carrier device 120, pairing information that can be utilized to connect to the Wi-Fi hotspot service or access point. As discussed above, it is contemplated that an application of the carrier device 120, such as one that may be associated with the media capturing device 110, can activate and/or deactivate the hotspot of the carrier device 120 or define and/or change the pairing information, among other things.

In some embodiments, the media capturing device 110 includes a Wi-Fi component 113 that can wireless couple to access points and hotspots, such as hotspot component 128 of FIG. 2. When connected to a hotspot, particularly one having network connectivity to the Internet (e.g., hotspot component 128 of FIG. 2), the media capturing device 110 can employ the connection to communicate with other computing devices also having Internet connectivity. As described herein, the media capturing device 110 can receive pairing information from the carrier device 120 to facilitate its connection to its hotspot. In a preferred embodiment, the pairing information (e.g., WPA, WPA2, WPA3, WEP, TKIP, Wi-Fi access credentials generally) is associated with the Wi-Fi hotspot service of the carrier device 120, though it is contemplated that the pairing information may be associated with another Wi-Fi hotspot or an access point within the range of the carrier device 120 and/or the media capturing device 110.

As described herein, the media capturing device 110 can be associated with a unique identifier, such as a unique serial number, MAC identifier, IP address, code name, or the like. In a preferred embodiment, the unique identifier associated with the media capturing device 110 is communicated or otherwise received by the carrier device 120. In embodiments where the media capturing device 110 is wirelessly paired with the carrier device 120 (e.g., via a Bluetooth connection), it is contemplated that the unique identifier can be wirelessly communicated from the media capturing device 110 to the carrier device 120 via the short range wireless pairing there between. In embodiments where no short range wireless pairing is available, it is contemplated that the unique identifier can be manually entered (e.g., via a keyboard), or otherwise input by other means, into the carrier device 120 so that the unique identifier of the media capturing device 110 is stored or otherwise received by the carrier device 120. It is also contemplated that the ability to receive and store the unique identifier of the media capturing device 110 is facilitated by the application associated with the media capturing device 110 executing on the carrier device 120.

In various embodiments, after the hotspot or access point pairing information is provided to media capturing device 110, and the unique identifier is provided to the carrier device 120, the Wi-Fi component 113 of the media capturing device 110 can connect to the access point or the hotspot of the carrier device 120 to access the network 130 of FIG. 1. In some embodiments, after the exchange of the pairing information and the unique identifier between the media capturing device 110 and the carrier device 120 is completed, the short range wireless pairing between the media capturing device 110 and the carrier device 120 can be terminated. After the unique identifier of the media capturing device 110 is provided to the carrier device 120, and the pairing information of the carrier device 120 is provided to the media capturing device 110, the carrier device 120 can establish connectivity to the network 130 via its carrier service, and the Wi-Fi component 113 of the media capturing device 110 can establish connectivity to the network 130 via the hotspot of the carrier device 120.

In some embodiments, in response to establishing connectivity to the network 130, a live streaming component 114 of the media capturing device 110 can contact a streaming server, such as streaming server 140 of FIG. 1, via network 130. When the live streaming component 114 of the media capturing device 110 contacts the streaming server 140, the live streaming component 114 can communicate the unique identifier of the media capturing device 110 to the streaming server 140, so that a live stream associated with the media capturing device 110 can be created.

Figure 4:
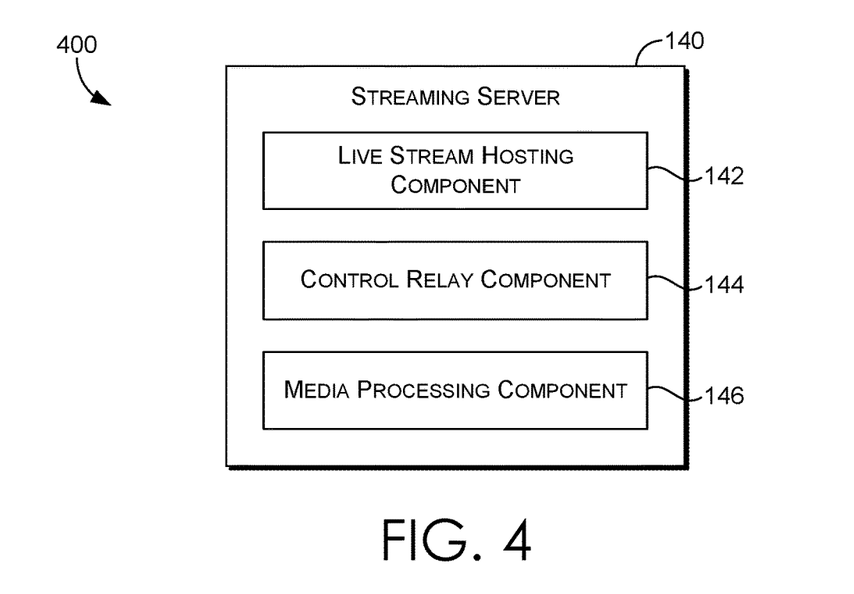
FIG. 4 is a block diagram of a streaming server according to some embodiments of the present invention.

Looking now to FIG. 4, a block diagram 400 of a streaming server 140, also described herein as streaming server, is provided. The streaming server 140 can include one or more computing devices as described in accordance with the computing device 700 of FIG. 7, and can host or otherwise facilitate the creation of a live stream of media data (e.g., video data, audio data) captured by the media capturing device 110 and accessible via the network 130. The streaming server 140 can include, among other things, a live stream hosting component 142, a control relay component 144, and a media processing component 146. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

In various embodiments, the live stream hosting component 142 can generate a live streaming session associated with the media capturing device 110 in response to receiving a request from the media capturing device 110 to create a new live stream. In some embodiments, the request can include the unique identifier of the media capturing device so that the live stream is created by the live stream hosting component 142 in association with the unique identifier. In some embodiments, the live stream hosting component 142 can generate a URL to the live stream, whereby the URL is uniquely associated with the unique identifier of the media capturing device 110. The live stream hosting component 142, in some instances, can limit access to the live stream by creating and/or associating access credentials to the live stream. In some embodiments, because the carrier device 120 is already aware of the unique identifier associated with the media capturing device 110, the carrier device 120 can query the streaming server 140, or request from the streaming server 140, the URL associated with any live stream created in association with the media capturing device 110 or the unique identifier thereof. In some other embodiments, the carrier device 120 can simply utilize the unique identifier of the media capturing device 110 with a known URL schema to identify the URL associated with the live stream. The URL, and the access credentials (if applicable), can be shared to the carrier device 120 or applications executing thereon via the network 130, such that the carrier device 120 can access the URL and/or share the URL with other computing devices, such as computing devices 150a, 150b of FIG. 1. It is contemplated that the URL can then be shared to other computing devices in text messages, emails, instant chats, social media, and the like.

In some embodiments, the streaming server 140 includes a control relay component 144 that enables a remote computing device, such as any of carrier device 120 or other computing devices 150a or 150b, to remotely send operations to the media capturing device 110. That is, the control relay component 144 of streaming server 140 can receive one or more commands from a remote computing device accessing a live stream of media capturing device 110, and relay the command from the remote computing device to the media capturing device 110. In this way, the media capturing device 110 can receive the command and perform an operation that corresponds to the command. The commands can include any type of command that can control operations of the media capturing device 110 or components thereof. By way of non-limiting example, the commands can include turning on or off one or more modules or components (e.g., turning on/off cameras, microphones, speakers, flashlights), zooming in or out, turning up or down features (e.g., brightness, contrast, volume), activating or deactivating features (e.g., image stabilization, noise cancellation), or the like. In further embodiments, the media capturing device 110 can receive any of the foregoing commands and perform the function that corresponds to the command received via the control relay component 144. In this way, all other computing devices accessing the live media stream can view the media stream, which has been modified based on the functions or operations performed based on commands received by the media capturing device.

In some embodiments, the streaming server 140 can include a media processing component 146 that can perform operations on the live stream independent of or in conjunction with the features offered by media capturing device 110. In embodiments, the media processing component 146 can include features such as audio or video compression, video editing (e.g., editing brightness, contrast, color), audio editing (e.g., increasing or decreasing volume, adjusting tones), electronic image stabilization, remote annotation, digital zoom, snapshotting video frames, and remote recording, among other things. The media processing component 146 can also be controlled based on commands received from a remote computing device, such as any of carrier device 120 or other computing devices 150a or 150b, that remotely send operations to the streaming server 140. The media processing component 146 can receive a command and perform any of the foregoing operations, among any other operation contemplated though not discussed herein, to the live media stream so that other computing devices accessing the live media stream can view the media stream that has been modified based on the performed operations.

Figure 5:
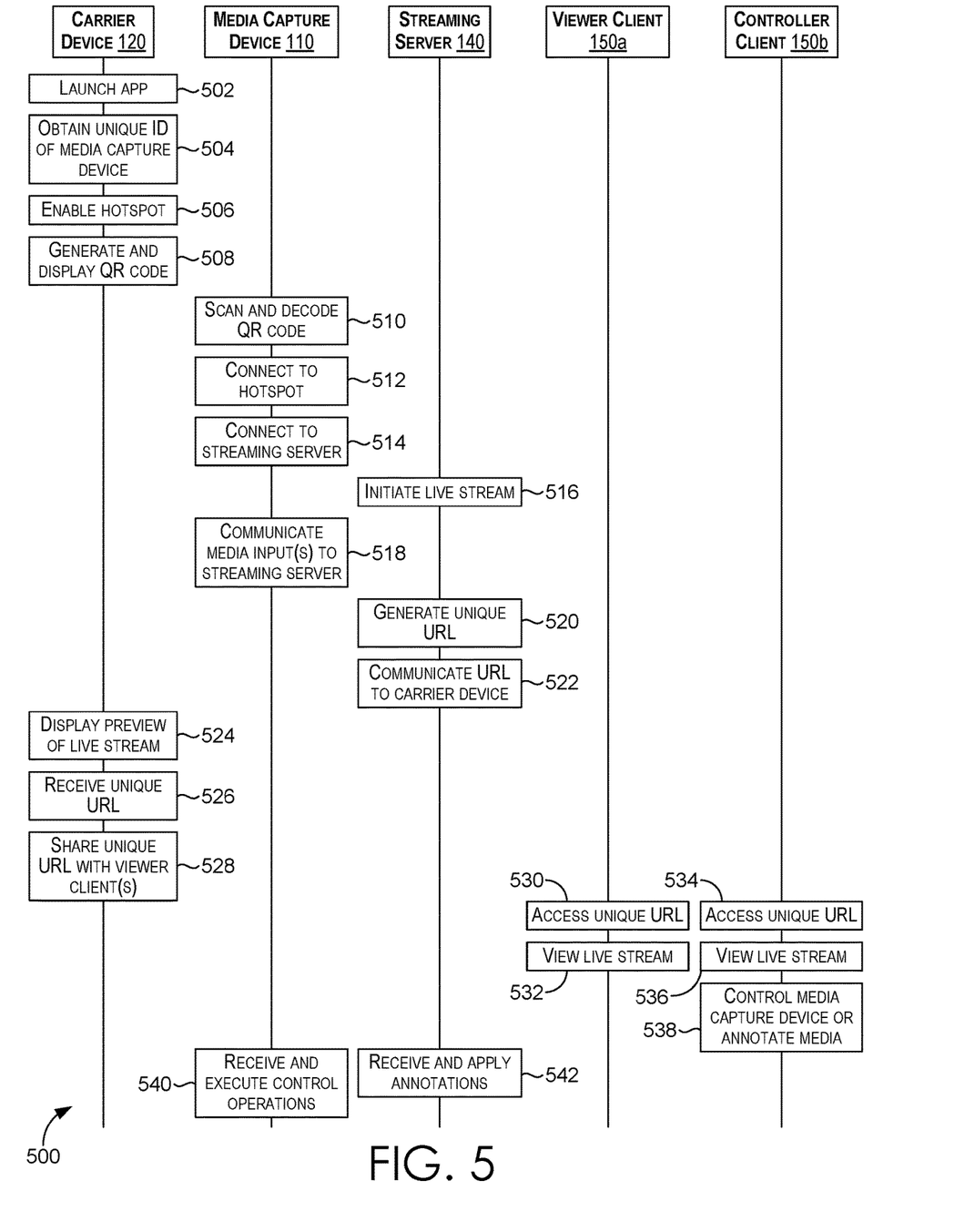
FIG. 5 is a swim lane diagram of a wireless video streaming system in accordance with some embodiments of the present invention.

Turning now to FIG. 5, a swim lane diagram 500 is provided, illustrating a process flow for a system including a media capturing device 110, a carrier device 120, a streaming server 140, a viewer client 150a (also referenced herein as a remote computing device 150a), and a controller client 150b (also referenced herein as a remote computing device 150b). In an embodiment, the carrier device 120 can include an application associated with the media capturing device 110. At block 502, a user of the carrier device 120 can launch the application, which presents a prompt for inputting a unique identifier associated with the media capturing device 110. In some aspects, at block 504, the unique identifier of the media capturing device 110 can be input by voice, by keyboard input, by touch gestures, or any other input method available to the carrier device 120. Based on the unique identifier being received, the carrier device 120 at block 506 can enable a hotspot 506 of the carrier device 120. In some embodiments, the carrier device 120 can create a name and/or access credentials for the hotspot 506, which any other remote computing device must have for authorized connectivity to the hotspot. The carrier device 120, at block 508, can then employ the name and/or access credentials to generate a QR code that corresponds to the name and/or access credentials for accessing the hotspot.

At block 510, the media capturing device 110 can scan and decode the QR code displayed on the carrier device 120. At block 512, the media capturing device 110 can connect to the hotspot of the carrier device 120 in response to scanning and decoding the QR code. Once the media capturing device 110 is connected to the hotspot, the media capturing device 110 can automatically connect to the streaming server 140 at block 514, utilizing a known hostname or IP address of the streaming server 140. The media capturing device 110 can, upon connecting to the streaming server 140, provide the streaming server 514 with its unique identifier along with a request to start a live stream. At block 516, the streaming server 140 can initiate a live stream associated with the media capturing device 110, or the unique identifier of the media capturing device 110. Once the live stream is created, the media capturing device 110 can, at block 518, communicate any media inputs captured thereby to the streaming server 140.

At block 520, the streaming server 140 can generate a unique URL that corresponds to the live stream. In some embodiments, the unique URL can include or be generated based on the unique identifier of the media capturing device 110. At block 522, the streaming server 140 can communicate the generated URL to the carrier device 120. It is contemplated that because the carrier device 522 is aware of the unique identifier of the carrier device 120, the unique URL can be communicated to the carrier device 120 because any requests for the unique URL can be discreetly made by identifying the unique identifier of the media capturing device 110.

At block 524, the carrier device 120 can access the unique URL, which corresponds to the live stream of the media capturing device 110, and thus a preview of the live stream can be displayed on a display of the carrier device 120. If a user of the carrier device 120 is satisfied with the preview, or wishes to proceed with generating the live stream, the user at block 526 can choose to receive the unique URL associated with the live stream. In this way, the unique URL of the live stream is received by the carrier device 120 at block 526. The unique URL can be cut, copied, or pasted throughout a variety of applications on the carrier device, so that the unique URL can be shared with other viewer clients at block 528.

At block 530, a viewer client 150*a* can receive and access the unique URL so that it can view the live stream at block 532. Similarly, a controller client 150*b* can receive and access the unique URL to view the live stream at block 536. In some embodiments, at block 538, the controller client 150*b* can have unique credentials, or a second URL provided by the streaming server 140, so that the controller client 150*b* can employ remote control features of the live stream. Such remote control features are described in further detail with respect to media control interfacing component 115 of FIG. 3, or control relay component 144 or media processing component 146 of FIG. 4. At block 550, the media capturing device 110 can receive and execute the control operations sent from the controller client 150*b* through the streaming server 140. Alternatively, the streaming server 140 at block 542 can receive and apply other control operations, including applying annotations to the live stream.

Figure 6:
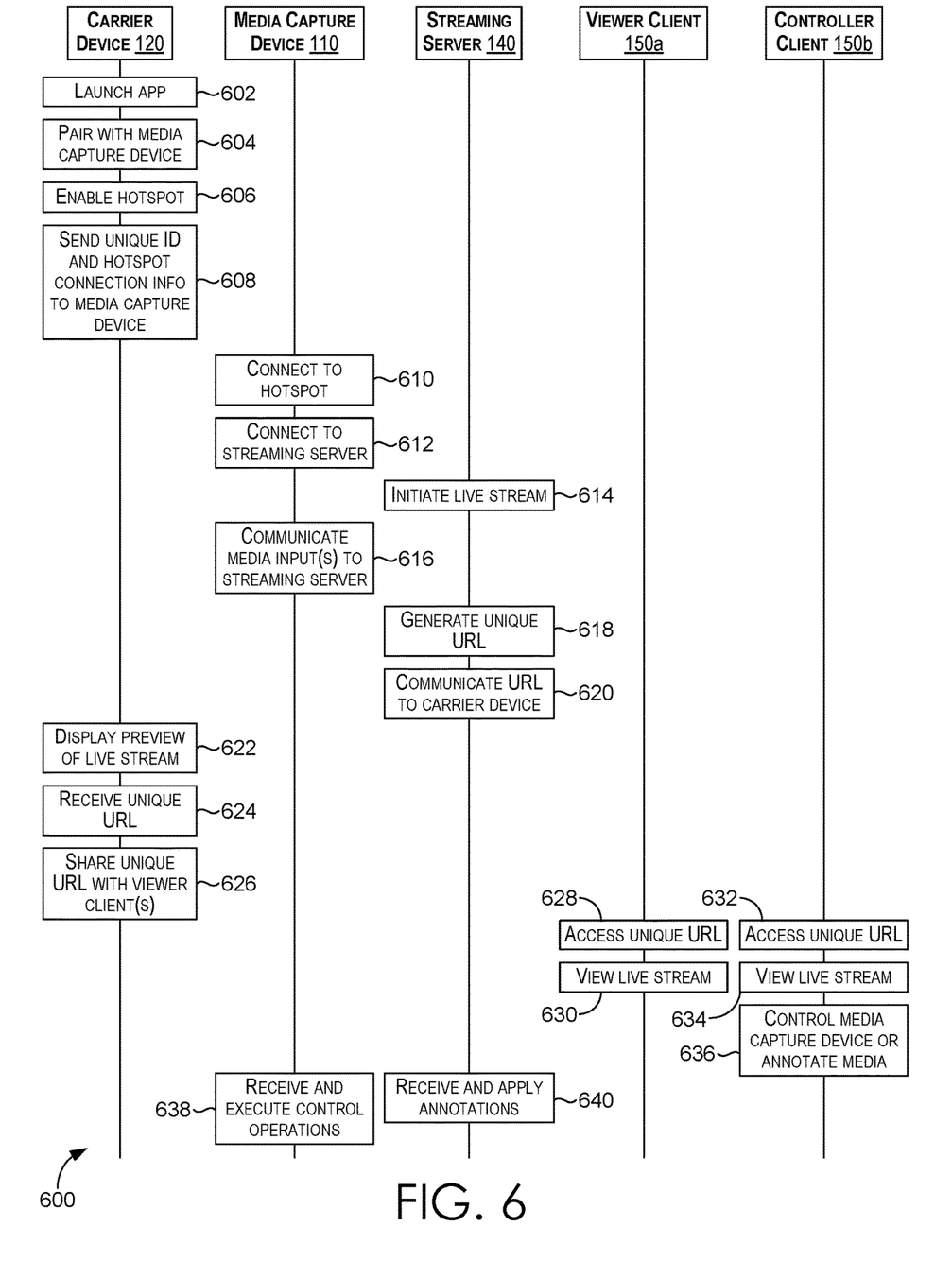
FIG. 6 is a swim lane diagram of a wireless video streaming system in accordance with some embodiments of the present invention.

Turning now to FIG. 6, another swim lane diagram 600 is provided, illustrating a process flow for a system including a media capturing device 110, a carrier device 120, a streaming server 140, a viewer client 150*a* (also referenced herein as a remote computing device 150*a*), and a controller client 150*b* (also referenced herein as a remote computing device 150*b*). In an embodiment, the carrier device 120 can include an application associated with the media capturing device 110. At block 602, a user of the carrier device 120 can launch the application. At block 604, carrier device 120 can be wirelessly paired (e.g., via Bluetooth) with the media capturing device 110. During the pairing process, the unique identifier of the media capturing device 110 can be communicated to the carrier device 120. At block 616, after the pairing process is completed, the carrier device 120 can enable its hotspot so that any computing device connected thereto can access the Internet through the carrier device 120. At block 608, the carrier device 120 can send the name of the hotspot and its access credentials to the media capturing device 110 over the paired (e.g., Bluetooth) connection.

At block 610, the media capturing device 110 can connect to the hotspot of the carrier device 120 in response to its receipt of the hotspot name and access credentials. Once the media capturing device 110 is connected to the hotspot, at block 612, the media capturing device 110 can automatically connect to the streaming server 140 utilizing a known hostname or IP address of the streaming server 140. The media capturing device 110 can, upon connecting to the streaming server 140, provide the streaming server 140 with its unique identifier along with a request to start a live stream. At block 614, the streaming server 140 can initiate a live stream associated with the media capturing device 110, or the unique identifier of the media capturing device 110. Once the live stream is created, the media capturing device 110 can, at block 616, communicate any media inputs captured thereby to the streaming server 140.

At block 618, the streaming server 140 can generate a unique URL that corresponds to the live stream. In some embodiments, the unique URL can include or be generated based on the unique identifier of the media capturing device 110. At block 620, the streaming server 140 can communicate the generated URL to the carrier device 120. It is contemplated that because the carrier device 120 is aware of the unique identifier of the carrier device 110, the unique URL can be communicated to the carrier device 120 because any requests for the unique URL can be discreetly made by identifying the unique identifier of the media capturing device 110.

At block 622, the carrier device 120 can access the unique URL, which corresponds to the live stream of the media capturing device 110, and thus a preview of the live stream can be displayed on a display of the carrier device 120. If a user of the carrier device 120 is satisfied with the preview, or wishes to proceed with generating the live stream, the user at block 624 can receive the unique URL associated with the live stream. In this way, the unique URL of the live stream is received by the carrier device at block 624. The unique URL can be cut, copied, or pasted throughout a variety of applications on the carrier device, so that the unique URL can be shared with other viewer clients at block 626.

At block 628, a viewer client 150*a* can receive and access the unique URL so that it can view the live stream at block 630. Similarly, a controller client 150*b* can receive and access at block 632 the unique URL to view the live stream at block 634. In some embodiments, at block 636, the controller client 150*b* can utilize unique credentials, or a second URL provided by the streaming server 140, so that the controller client 150*b* can employ remote control features of the live stream. Such remote control features are described in further detail with respect to media control interfacing component 115 of FIG. 3, or control relay component 144 or media processing component 146 of FIG. 4. At block 638, the media capturing device 110 can receive and execute the control operations sent from the controller client 150b through the streaming server 140. Alternatively, the streaming server 140 at block 640 can receive and apply other control operations, including applying annotations to the live stream.

Having described embodiments of the present invention, an exemplary operating environment in which embodiments of the present invention may be implemented is described below in order to provide a general context for various aspects of the present invention. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output (I/O) ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be equipped with depth cameras, such as stereoscopic camera systems, infrared camera systems, RGB camera systems, touchscreen technology, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

As can be understood, embodiments of the present invention provide for, among other things, a system and techniques for facilitating live streaming with a media capturing device and the remote annotation of such live streams. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computerized system, comprising:
   a media capturing device having at least one media input module,
   a streaming server, and
   a carrier device having at least one processor and at least one storage media storing computer-usable instructions that, when used by the at least one processor, cause the at least one processor to:
     provide credentials to access a wireless hotspot of the carrier device to the media capturing device, wherein the media capturing device is configured to access the wireless hotspot and initiate, with the streaming server via a carrier network of the carrier device, a live media stream in response to the provided credentials, the live media stream corresponding to media information being captured via the at least one media input module;
     generate a request to access the live media stream via the carrier network;
     communicate the request to the streaming server via the carrier network, wherein the streaming server is configured to generate a URL associated with the live media stream;
     receive the URL associated with the live media stream from the streaming server via the carrier network; and
     access the URL via the carrier network to display the live media stream.

2. The system of claim 1, wherein the paired session is a Bluetooth session.

3. The system of claim 1, wherein the media capturing device is associated with a unique identifier, and the media stream is initiated in association with the unique identifier.

4. The system of claim 1, wherein the media information includes audio data and video data.

5. The system of claim 1, wherein the request to access the live stream is generated based on the unique identifier associated with the media capturing device.

6. The system of claim 1, wherein the URL is associated with a relay of the live stream, the relay being hosted by the streaming server.

7. The system of claim 1, wherein the instructions further cause the at least one processor to:
   establish a paired session with the media capturing device, wherein the credentials are provided over the paired session.

8. The system of claim 1, wherein the credentials to access the wireless hotspot of the carrier device are provided by displaying a QR code that includes the credentials.

9. The system of claim 1, wherein the request to access the live stream is generated in response to the wireless hotspot being accessed.

10. The system of claim 1, wherein the wireless hotspot provides Internet connectivity to the carrier device.

11. A media capturing device comprising:
    at least one processor, and
    at least one storage media storing computer-usable instructions that, when used by the at least one processor, cause the at least one processor to:
      establish a paired session with a carrier device, wherein a unique identifier of the media capturing device is communicated to the carrier device via the paired session;
      receive, from the carrier device via the paired session, credentials to access a wireless hotspot of the carrier device;
      connect to the wireless hotspot of the carrier device in response to the received credentials, wherein a streaming server is accessible via a carrier network of the carrier device, the carrier network being communicatively coupled to the wireless hotspot; and
      responsive to connecting to the wireless hotspot, initiate a live media stream with the streaming server via the carrier network, wherein the live media stream is associated with the unique identifier and includes media data being captured via at least one media input module of the media capturing device,
      wherein the streaming server is configured to generate a URL associated with the live media stream so as to provide the carrier device access to the live media stream via the URL.

12. The media capturing device of claim 11, wherein the paired session includes a Bluetooth session.

13. The media capturing device of claim 11, wherein the paired session is established, the wireless hotspot is connected to, and the live stream is initiated, via an application associated with the media capturing device, the application executing on the carrier device.

14. The media capturing device of claim 11, wherein the media data includes audio data and video data.

15. The media capturing device of claim 11, wherein the URL is further associated with the unique identifier.

16. The media capturing device of claim 11, wherein the wireless hotspot includes a Wi-Fi access point.

17. A computer-implemented method for live streaming, comprising:
    establishing, by a carrier device, a paired session with a media capturing device, wherein the media capturing device is configured to capture live media data and is associated with a unique identifier;
    communicating, by the carrier device, credentials to access a wireless hotspot of the carrier device to the media capturing device via the paired session, wherein the media capturing device is configured to access the wireless hotspot and initiate, with a streaming server via a carrier network of the carrier device, a live media stream associated with the unique identifier in response to the communicated credentials, the live media stream corresponding to the live media data being captured;
    generating, by the carrier device, a request to access the live media stream via the carrier network, the request being generated based on the unique identifier associated with the media capturing device;
    communicating, by the carrier device, the request to the streaming server via the carrier network, wherein the streaming server is configured to generate a URL associated with the live media stream;

receiving, by the carrier device, the URL associated with the live media stream from the streaming server via the carrier network; and providing for display, by the carrier device, the live media stream in response to the URL being accessed thereby.

18. The method of claim 17, wherein the paired session includes a Bluetooth session.

19. The method of claim 17, wherein the live media data includes video data and audio data.

20. The method of claim 17, wherein the URL is associated with a relay of the live stream, and the relayed live stream is provided for display in response to the URL being accessed.

\* \* \* \* \*

UNITED STATES PATENT AND TRADEMARK OFFICE
CERTIFICATE OF CORRECTION

| | | |
|---|---|---|
| PATENT NO. | : 11,985,378 B1 | Page 1 of 1 |
| APPLICATION NO. | : 18/055374 | |
| DATED | : May 14, 2024 | |
| INVENTOR(S) | : Christopher Parkinson, Noah Nicholas Balmer and James Peter Woodall | |

It is certified that error appears in the above-identified patent and that said Letters Patent is hereby corrected as shown below:

In the Specification

1. In Column 1, Lines 2 and 3, in the line reading "commonly–assigned and concurrently-filed application: Attorney docket number 40962.386963, titled "Wireless" should read -- commonly–assigned and concurrently-filed U.S. Patent Application No. 18/055,369, titled "Wireless --

2. Column 4, Lines 13-14, in the line reading "would not not be interrupted by the closing or changing of" should read -- would not be interrupted by the closing or changing of --

3. Column 7, Line 18, in the line reading "have an interactive user interface or display— each of which" should read -- have an interactive user interface or display - each of which --

Signed and Sealed this
Sixteenth Day of July, 2024

Katherine Kelly Vidal
*Director of the United States Patent and Trademark Office*